Figure 6:
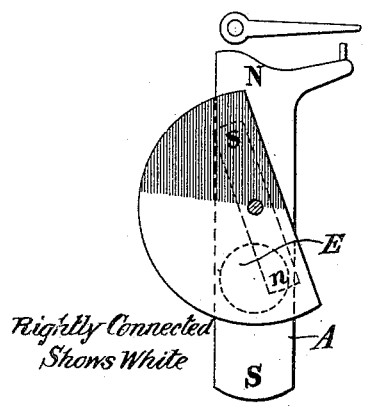

(No Model.)  2 Sheets—Sheet 1.
J. J. WOOD.
ELECTRICAL MEASURING INSTRUMENT AND CURRENT DIRECTION INDICATOR.
No. 468,020. Patented Feb. 2, 1892.
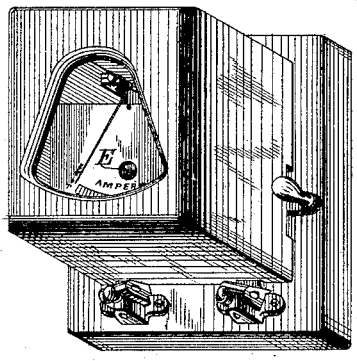
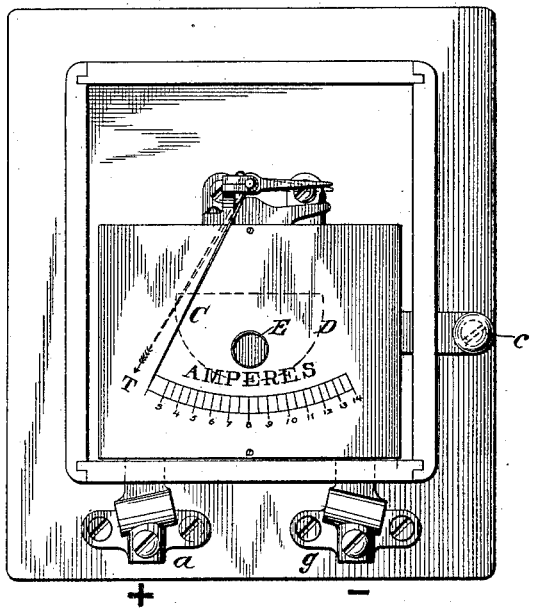
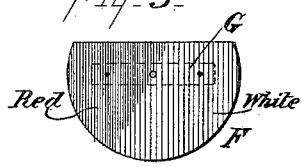
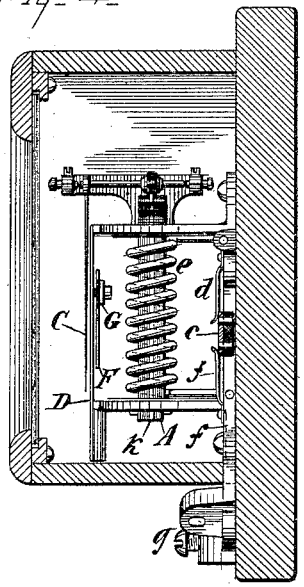
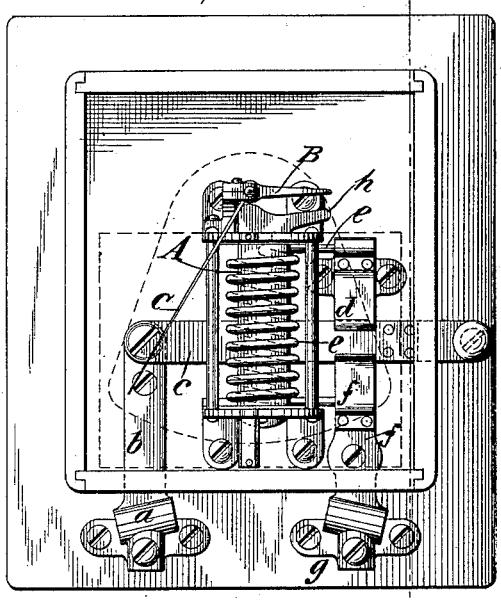
WITNESSES:
John Becker
Fred White
INVENTOR
James J. Wood,
BY
Arthur C. Fraser & Co
ATTORNEYS.

(No Model.) 2 Sheets—Sheet 2.
J. J. WOOD.
ELECTRICAL MEASURING INSTRUMENT AND CURRENT DIRECTION INDICATOR.

No. 468,020. Patented Feb. 2, 1892.

Rightly Connected Shows White

Wrongly Connected Shows Red.

WITNESSES:
John Becker
Fred White

INVENTOR
James J. Wood,
BY
Arthur C. Fraser & Co.
ATTORNEYS.

UNITED STATES PATENT OFFICE.

JAMES J. WOOD, OF FORT WAYNE, INDIANA.

ELECTRICAL MEASURING INSTRUMENT AND CURRENT-DIRECTION INDICATOR.

SPECIFICATION forming part of Letters Patent No. 468,020, dated February 2, 1892.

Application filed November 3, 1891. Serial No. 410,729. (No model.)

*To all whom it may concern:*

Be it known that I, JAMES J. WOOD, a citizen of the United States, residing in Fort Wayne, in the county of Allen and State of Indiana, have invented certain new and useful Improvements in Electrical Measuring Instruments and Current-Direction Indicators, of which the following is a specification.

This invention provides an improved indicator for showing at a glance the direction in which a current is flowing over a circuit. Such indicators are chiefly useful in connection with electrical measuring instruments, such as ammeters or voltmeters; and my invention provides for the application of such an indicator to such measuring-instruments. It also provides certain other improvements in electrical measuring instruments.

In arc-lighting stations it is important to provide means for indicating the direction in which the current is traversing the external circuit or line. There is liability that a careless or ignorant workman will transpose the connections at the central-station switchboard, thereby causing the current to flow over the line in the wrong direction. The arc lamps are invariably connected in the circuit to receive the current in a certain direction, so that it shall pass downwardly through the carbons of each lamp, and as the positive carbon wastes away about twice as fast as the negative carbon it is made twice as long in order that both shall burn out simultaneously. If, however, the connections are accidentally transposed, so that the current passes in the wrong direction over the line, it flows upwardly through the lamp-carbons, and the lower or shorter carbon becomes the positive and wastes away twice as rapidly as if properly connected, so that when about half the time during which the lamp is designed to burn has elapsed the lower carbon is entirely consumed and the arc passes between the lower-carbon holder and the upper carbon, thereby fusing the lower-carbon holder and destroying it. As this occurs almost simultaneously with all lamps on the circuit, the loss thereby occasioned is a serious one. To obviate the liability of the circuit being wrongly connected, so as to reverse the current over the line, my invention provides a little indicator, which may be introduced either permanently or temporarily into the circuit, and which shows in an unmistakable manner if the current be flowing in the wrong direction. A current-direction indicator is also desirable in connection with electric voltmeters, ammeters, and other electrical measuring instruments. In the use of some such measuring-instruments it is important that the electrical wires be always connected, so as to pass the current through the instrument in a given direction, as if the connections be reversed the instrument will either not indicate at all or will give an incorrect indication. To insure this result, the binding-posts of such instruments are usually marked with the positive and negative signs; but notwithstanding this precaution the connections are frequently wrongly made. My invention provides means for indicating at a glance whenever the wires are wrongly connected.

By preference my invention accomplishes simultaneously both objects above suggested by applying my improved current-direction indicator to the electrical measuring instrument used for testing purposes in central stations, so that whenever a test is made of a circuit an indication is afforded if the current be flowing in the wrong direction, or the instrument may be connected permanently in the circuit, so that the indicator acts when the connections are made to show if they be wrongly made.

To this end in the preferred form of my invention as applied to an ammeter, voltmeter, or other analogous instrument, I provide an opening in the dial-plate of the instrument, which ordinarily shows white when the instrument is at rest or when the connections are properly made, but turns instantly a bright red when the wires are improperly connected. This, however, is only one of several ways within the scope of my invention of indicating to the eye or other sense of the operator that he has wrongly connected the wires.

According to my invention I provide a delicately-pivoted permanent magnet arranged in inductive proximity to an electro-magnet which is traversed by the current and the polarity of which consequently is determined by the direction of the current, the permanent magnet being provided with a spring or counter-weight, by means of which it is caused, when at rest, to stand in a position transverse to the lines of force of such electro-magnet, so that when a current is sent through the latter the permanent magnet will turn or swing upon its pivot to a position as nearly as possible parallel with the lines of force of the electro-magnet. When the current is passed through the instrument in the proper direction, the pivoted permanent magnet swings to one side; but when the connections are improperly made, so that the current passes in the wrong direction, the pivoted magnet swings to the opposite side. Attached or connected to the pivoted magnet is some sort of tell-tale device, by means of which an indication is afforded to the operator to which side the magnet is swung. The simplest and preferable construction is to attach to the pivoted magnet a small light disk painted partly red and partly white and which is so exposed beneath an opening in a dial plate or screen that when at rest or swung to the side indicative of a current in the right direction its white face appears through the opening; but when swung to the opposite side, indicative of an inverted current, its red surface moves into view through the opening. Various other indicating or tell-tale devices may be employed, however, instead of this simple arrangement of disk and opening. When applied to a current-measuring instrument, the electro-magnetic member of the instrument is utilized as the electro-magnet referred to.

In Figs. 1 to 8 of the drawings I have shown my invention as applied to an ammeter the general construction of which is similar to that embodied in my patent, No. 412,354, dated October 8, 1889. This particular construction is selected only by way of illustration, as my present invention is applicable to other constructions of ammeters or other measuring-instruments.

Figure 7:
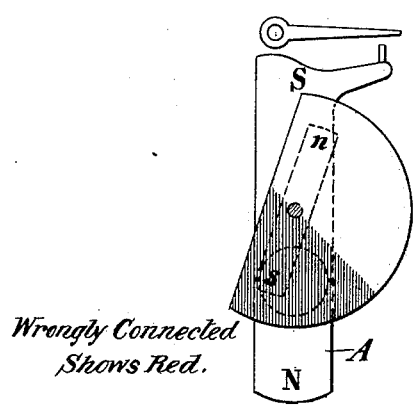
Figure 8:
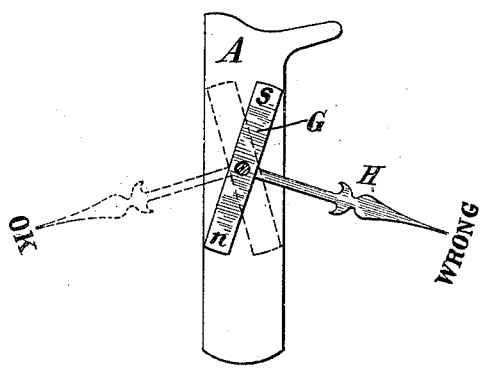
Figure 9:
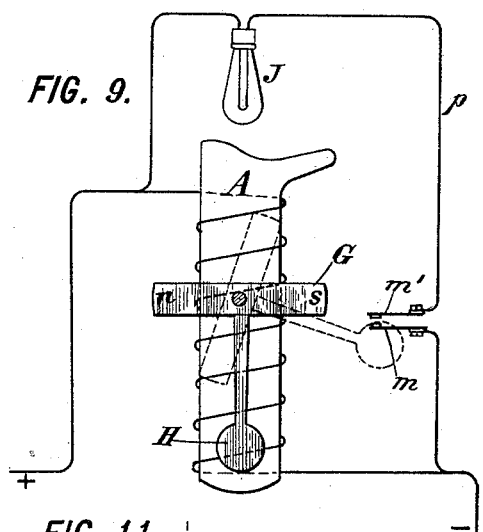
Figure 10:
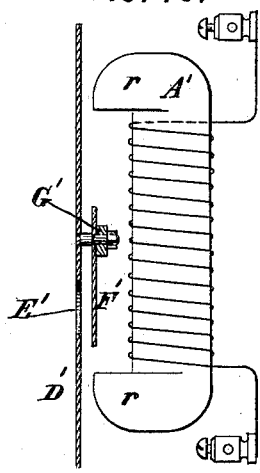
Figure 11:
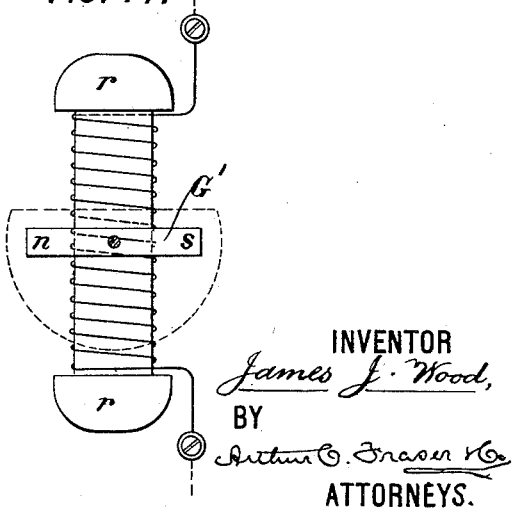

Figure 1 of the accompanying drawings is a perspective view of the instrument. Fig. 2 is a front elevation thereof with the outer case removed. Fig. 3 is a front view of the indicating-disk. Fig. 4 is a vertical transverse section on the line 4 4 in Fig. 5. Fig. 5 is a front view with the dial-plate and tell-tale removed. Figs. 6 and 7 are diagrammatic front views illustrating the operation of my invention. Figs. 8 and 9 are similar diagrammatic views illustrating modified constructions. Fig. 10 is a side elevation of a modified construction, being a current-direction indicator apart from any measuring-instrument. Fig. 11 is a front elevation thereof.

I will first describe my current-direction indicator as applied to a current-indicating instrument, with reference, particularly, to Figs. 1 to 7 of the drawings.

The particular form of current-indicating instrument shown is constructed with a vertically-disposed electro-magnet A, above which is pivoted a soft-iron armature B, to which is connected the indicating-needle or index C. The current enters the instrument through a positive binding-post $a$, passes through a strip $b$ and a switch-arm $c$ to a switch-plate $d$, (assuming the switch-arm to be thrown to its uppermost position,) thence through a coil $e$ of wire wound around the magnet A, and thence by a conducting-plate $f$ to the negative binding-post $g$. If the switch-arm $c$ is pressed down into engagement with the plate $f$, then the current is short-circuited between the binding-posts and the instrument is cut out. When a current passes, the electro-magnet A is magnetized, the lines of force thereof extending vertically and magnetizing the armature B, the larger pivoted end of which is in the denser part of the magnetic field, while its smaller free end is acted on by the less concentrated lines of force passing from a lateral arm $h$. Assuming the upper end of the magnet A to be a north pole, the pivoted end of the armature B becomes a south pole and its free end a north pole, and the latter is repelled by the north pole of the arm $h$ with a strength depending upon the strength of the current energizing the magnet A. The index C is consequently moved a greater or less distance over a graduated scale on a dial-plate in front of which the index moves. The instrument thus described is substantially identical in construction with one of the forms shown in my said previous patent. In an instrument thus constructed it is found in practice that when the circuit-wires are inversely connected, so that the current passes in the opposite direction through the instrument, thereby magnetizing the magnet A with its north pole below and its south pole above, the indication afforded by the instrument is not always correct, varying in greater or less degree, according to circumstances. The variations are believed to be due to the varying effect of the earth's magnetism. It is consequently essential to the correct use of the instrument that the current shall always be passed through it in the direction for which the instrument is calibrated. To practically insure this result is one of the purposes of my present invention.

In the dial-plate D, I form (in my preferred construction) a hole or opening E, behind which is freely pivoted a plate or disk F, (shown separately in Fig. 3,) about two-thirds of the surface of which is painted white, the remaining one-third being red or other color. A small permanent magnet G (shown in dotted lines in Fig. 3) is fastened to the rear side of this disk, and the disk is counterweighted, so that it shall maintain while at rest the position shown in Fig. 3, this counterweighting being preferably done by cutting off the top of the disk, as shown. When the disk hangs in its normal position, as shown in dotted lines in Fig. 2, a portion of its white surface shows through the opening E. In this position the permanent magnet G stands horizontally, its position being transverse to the direction of the lines of force which will be generated in the magnetic member A of the instrument upon the passage of the current. I will assume now that the current is turned on, the wires being properly connected. The current magnetizes the magnet A with the north pole at the top and the south pole at the bottom, as shown in Fig. 6, and instantly the inductive effect of the lines of force upon the small and delicately-pivoted permanent magnet G causes this magnet to swing around toward the left, carrying with it the disk F and occupying about the position shown in the diagram, Fig. 6, where the position of the opening E is shown by the dotted circle. The surface seen through the opening E consequently continues to show white, and the operator knows that he has rightly connected the wires. If, however, the operator were to invert the connections and thereby magnetize the magnet A with its south pole uppermost, as shown in Fig. 7, the permanent magnet G would swing around in the opposite direction, as shown in that figure, carrying with it the disk F and bringing the red portion thereof behind the opening E, as clearly shown. This opening would then show a brilliant red spot, and the operator would instantly know that he had reversed the connections of the wires.

The tell-tale or indicating device operated by the magnet G, instead of consisting of a disk or plate F, carrying a colored section or some other distinctive mark upon its surface, might be greatly varied by the substitution of any of the other indicating or tell-tale devices well known in the art—as, for example, by connecting to the magnet a hand or pointer which would swing to right or left—or by causing the movement of the magnet to light an incandescent electric lamp, or in many other ways that might be suggested. Figs. 8 and 9 show these modifications. The same form of electro-magnet A is here illustrated, and in front of it is the pivoted permanent magnet G, counterpoised by a weighted arm H, which in Fig. 8 serves as a pointer swinging toward the left to show that the connections are rightly made or to the right to show that they are wrongly made. In the construction shown in Fig. 9 the weighted arm in swinging toward the right presses together two contact-springs $m$ $m'$ and thereby closes a branch circuit $p$, including an incandescent electric lamp J, which consequently glows and thereby indicates to the operator that he has incorrectly connected the wires. The simpler construction first described is, however, preferable.

My invention also introduces a feature of improvement applicable to the type of electrical measuring instruments shown and other analogous instruments employing an electro-magnet as the magnetic member. In order to render the instrument sensitive, it is necessary to eliminate the effect of residual magnetism upon the magnet A. To accomplish this, I subdivide the core of the magnet A into two parts, separating them slightly either by an air-space or preferably by interposing a brass plate $k$ between them, as shown in Fig. 4. The subdivisions of the core are both inclosed within the same coil, and are consequently magnetized alike; but upon the cessation of the current, as their like poles are closely adjacent, each acts to repel the other and thereby tends to demagnetize the other so that the core retains as a whole less residual magnetism than if a solid core were employed. The pivoted armature B is mounted over the subdivision between the two sections of the core, so that it is acted upon equally by both. The respective sections of the core are preferably built up of thin plates or laminæ placed together.

My improved current-direction indicator may be constructed apart from any electrical measuring instrument. One suitable construction in such case is that shown in Figs. 10 and 11, where A' is the electro-magnet having its coil connected to binding-posts for connection with the circuit-wires, and G' is the permanent magnet pivoted in a plane intersecting the overhanging polar ends $r$ $r$ of the electro-magnet. If the construction of disk tell-tale first described be employed with this instrument, a dial-plate or screen D' will be placed in front of it, having an opening E', through which is seen an indicator F', having a permanent magnet, and which is painted white and red, as shown in Fig. 3, the operation being the same as already described with reference to Figs. 6 and 7.

I claim as my invention the following defined novel features or improvements, substantially as hereinbefore specified, namely:

1. A current-direction indicator consisting of the combination of an electro-magnet traversed by the current, a permanent magnet pivoted within the inductive influence of the electro-magnet and having a normal tendency to assume a position transverse to the lines of force of the electro-magnet, and a tell-tale connected to and operated by said permanent magnet, whereby it moves to one side when the current passes in one direction and to the opposite side when it passes in the other direction.

2. A current-direction indicator consisting of the combination of an electro-magnet traversed by the current, a permanent magnet pivoted within the inductive influence of the electro-magnet and having a normal tendency to assume a position transverse to the lines of force of the electro-magnet, and a tell-tale or indicating plate connected to and moved by said permanent magnet, whereby it moves to one side when the current passes in one direction and to the opposite side when it passes in the other direction, and a stationary dial-plate or screen having an opening in front of said plate through which the indication carried by the plate may be seen.

3. A current-direction indicator consisting of the combination of an electro-magnet traversed by the current, a permanent magnet pivoted within the inductive influence of the electro-magnet, a stationary dial-plate or screen, and a tell-tale or indicating plate connected to said permanent magnet arranged behind an opening in said screen, having a normal tendency to assume a certain position when at rest and bearing upon its surface a distinctive mark or color not normally visible through said opening, whereby when a current is passed through the electro-magnet said permanent magnet swings to one side or the other, according to the direction of the current, and thereby moves said indicating-plate and in the position indicating an incorrect connection of the terminals exposes a distinctive mark or color on said plate behind the opening therein.

4. The combination, with an electric measuring instrument, of an indicator for showing whether the terminal connections are correctly made, consisting of a permanent magnet pivoted within the inductive influence of the electro-magnetic member of the instrument, having a normal tendency to assume a position transverse to the lines of force in said electro-magnetic member, and a tell-tale connected to and operated by said permanent magnet, whereby it moves to one side when the terminals are rightly connected and to the opposite side when they are wrongly connected.

5. The combination, with an electric measuring instrument having a dial-plate D, with an opening through it, of an indicator consisting of a counterweighted disk F, pivoted behind said opening, and a permanent magnet G, attached to said disk and arranged within the inductive influence of the electro-magnetic member of the instrument.

6. In an electric measuring instrument comprising an electro-magnet, its inclosing-coil, and a repellent armature, the construction of said magnet with its core subdivided into two sections magnetically separated or insulated, whereby upon the cessation of the magnetizing current the like magnetic poles of the two sections mutually repel each other and thereby assist in the suppression of residual magnetism whereby the instrument is rendered more sensitive.

In witness whereof I have hereunto signed my name in the presence of two subscribing witnesses.

JAMES J. WOOD.

Witnesses:
E. J. HATHORNE,
BRAINARD RORISON.